United States Patent [19]
Lewis et al.

[11] Patent Number: 4,801,051

[45] Date of Patent: Jan. 31, 1989

[54] FLOW CONTROL DEVICE FOR A FLUID DISPENSING APPARATUS

[75] Inventors: William A. Lewis, Tucker; Robert G. Baker, Buford, both of Ga.

[73] Assignee: Nordson Corporation, Westlake, Ohio

[21] Appl. No.: 593,607

[22] Filed: Mar. 26, 1984

[51] Int. Cl.[4] .............................................. G01F 11/06

[52] U.S. Cl. ............................... 222/309; 74/424.8 B; 222/504; 222/518; 222/559; 251/60; 251/285

[58] Field of Search ................. 222/43, 250, 282, 309, 222/504, 510, 559, 44, 46–50, 518; 251/60, 285; 74/424.8 B, 841

[56] References Cited

U.S. PATENT DOCUMENTS

| | | | |
|---|---|---|---|
| 2,622,765 | 12/1952 | Gilmont | 222/46 |
| 2,893,130 | 7/1959 | Ierokomos | 74/424.8 B X |
| 3,094,254 | 6/1963 | Cullen et al. | 222/504 |
| 3,690,518 | 9/1972 | Baker et al. | 22/504 |

FOREIGN PATENT DOCUMENTS

| | | | |
|---|---|---|---|
| 1152465 | 3/1982 | Canada . | |
| 3108793 | 9/1982 | Fed. Rep. of Germany . | |
| 973983 | 11/1982 | U.S.S.R. | 74/424.8 B |
| 354006 | 8/1931 | United Kingdom | 74/424.8 B |
| 1214863 | 12/1970 | United Kingdom . | |

*Primary Examiner*—Kevin P. Shaver

*Attorney, Agent, or Firm*—Wood, Herron & Evans

[57] ABSTRACT

An improved liquid dispensing apparatus having a micro-adjustment of the opening travel of a needle valve of the apparatus. This micro-adjustment comprises a sleeve-stop member which is axially movable but non-rotatable in the body of the apparatus. One end of the sleeve-stop member forms an end-stop to limit opening movement of the needle valve away from the valve seat. Screw threads of a first pitch are formed on an external portion of the sleeve-stop member and internal screw threads of a second pitch different from the first pitch are formed on a portion of the apparatus body. A generally tubular adjustment screw element is engaged with both the internal scew threads of the body bore and the external screw threads of the sleeve-stop member so that rotation of the adjustment screw element causes differential axial movement of the sleeve-stop member for fine adjustment of the maximum opening needle valve travel.

2 Claims, 1 Drawing Sheet

FLOW CONTROL DEVICE FOR A FLUID DISPENSING APPARATUS

FIELD OF THE INVENTION

This invention generally relates to fluid dispensing apparatuses, such as apparatuses adapted for dispensing relatively viscous sticky substances, such as adhesives, hot melts, sealing compounds, etc., and more specifically to mechanisms and devices for adjusting flow through the nozzle orifices of such devices.

BACKGROUND OF THE INVENTION

The type of fluid dispensing apparatuses to which this invention generally relates provides for the flow of fluid through a body cavity in the apparatus and then out a nozzle orifice which directs the flow of the fluid onto a workpiece, for instance. Control of the flow through the nozzle orifice is typically effected through the movement of a valve member in the nozzle orifice. The valve member ordinarily seats in a valve seat formed in the nozzle orifice to close the nozzle orifice preventing fluid flow out of the body cavity. Movement of the valve member away from the nozzle orifice permits fluid to flow out through the orifice at a rate commensurate with the gap between the valve and valve seat.

It is of course very desirable to be able to accurately and adjustably control flow through the nozzle orifice opening. For instance, changes in the viscosity of material passing through the nozzle orifice will alter the rate of flow of material unless compensated for. Presently, time consuming nozzle changes are often required in order to yield the desired fluid flow.

The problem of flow control has been particularly noted in liquid-dispensing apparatuses for dispensing relatively viscous sticky substances, such as adhesives, hot melts, sealing compounds and the like, such as the liquid-dispensing apparatus which is disclosed in U.S. patent application Serial No. 400,373, filed 7/21/82, now U.S. Pat. No. 4,465,212 which is assigned to applicant's assignee, the disclosure of which is hereby incorporated by reference. This dispensing apparatus, or gun, has a generally cylindrical body with an axial bore therein. A nozzle communicates with one end of the bore, and has a nozzle orifice and a valve seat in the nozzle orifice. A needle valve having an elongated stem has its needle end engageable with the valve seat to thereby control the flow of liquid through the nozzle orifice through movement of the needle valve away from and into engagement with the valve seat. The needle valve is ordinarily biased into a closed position through the use of a compression spring which bears against part of a piston assembly carried on the needle valve. Movement of the needle valve away from the nozzle orifice is effected pneumatically, i.e. by the application of air under pressure to move the piston, to thereby move the needle valve against the bias of the spring. Adjustment of the travel of the needle valve of this liquid dispenser is unavailable except in the form of an adjustment of the compression spring tension, which merely adjusts the pneumatic pressure required to move the needle valve between closed and full open position. Precise flow control is therefore only available in such a dispenser by making nozzle changes, which is a time consuming process, as noted earlier.

SUMMARY OF THE INVENTION

It is a primary object of this invention to provide an improved flow control device for a fluid-dispensing apparatus which provides for the fine adjustment of the maximum travel of a valve member in a nozzle orifice.

A more particular object is to provide a flow control device for a liquid-dispensing apparatus which permits the fine adjustment of the maximum travel of a needle valve away from a valve seat in a nozzle orifice to thereby accurately and adjustably control the flow of liquid through the nozzle opening.

Still another object is to provide such a fine-adjust flow control device which is simple to construct, assemble and operate.

These and other objects have been accomplished in this invention in an improved flow control device for a fluid-dispensing apparatus which comprises a body, or fluid gun, with an axial bore therein and which has a nozzle communicating with one end of the bore. The nozzle has an orifice which is opened and closed by a valve member which is axially movable within the body bore.

The maximum length of travel of the valve member away from the nozzle orifice is achieved through a novel combination of threaded elements which utilize a pitch differential in two sets of threads to adjust the valve travel. More specifically, a sleeve-stop member which is axially movable in the body bore has one end which forms an end stop to the maximum movement of the valve away from the nozzle orifice. The sleeve-stop member is prevented from axial rotation, as by a setscrew on the body engaged in an axially extending slot in the side of the sleeve-stop member. External screw threads of a first pitch are formed on a portion of the sleeve-stop member. Internal screw threads of a second pitch, which is different from the first pitch, are formed on the body within the axial bore. Engaged with both the external screw threads of the sleeve-stop member and the internal threads of the axial bore is an adjustment screw element. This adjustment screw element includes a generally cylindrical portion which is externally match-threaded with threads of the second pitch and internally match-threaded with threads of the first pitch, with the adjustment screw element engaging the corresponding threads of the sleeve-stop member and axial bore as indicated.

Rotation of the adjustment screw element causes differential axial movement of the sleeve-stop member for adjustment of the maximum valve travel. That is, rotation of the adjustment screw causes the adjustment screw to screw into our out of the axial bore. Rotation of the adjustment screw also causes the sleeve member to move axially, but a different distance than the adjustment screw due to the pitch differential. Small movements of the stop on the end of the sleeve-stop member are thus obtained through the pitch differential of the elements. This is effected regardless of whether the pitch of the adjustment screw element is greater than that of the sleeve member or vice versa, as long as both pitches are of the same hand.

A particular application of the invention is in a liquid-dispensing apparatus which has a needle valve engageable with a valve seat to control the flow of a viscous liquid through a nozzle orifice. Movement of the needle valve is effected through the application of fluid pressure applied to a piston carried on the needle valve. Maximum travel of the needle valve away from the valve seat is controlled by the position of the sleeve-stop member which acts as an end stop to the valve piston. The external threads formed on the sleeve member are of a first pitch having more threads per inch than the second pitch of the threads on the axial bore. Overall movement of the sleeve member through rotation of the adjustment screw element is thus proportional to the difference between the first pitch and the second pitch, permitting fine adjustment of the needle valve travel away from the orifice with an appropriate pitch differential.

The foregoing objectives, features and advantages of the present invention will be more readily understood through consideration of the following detailed description of the invention taken in conjunction with the accompanying drawings, in which:

DETAILED DESCRIPTION OF AN EMBODIMENT OF THE INVENTION

Figure 1:
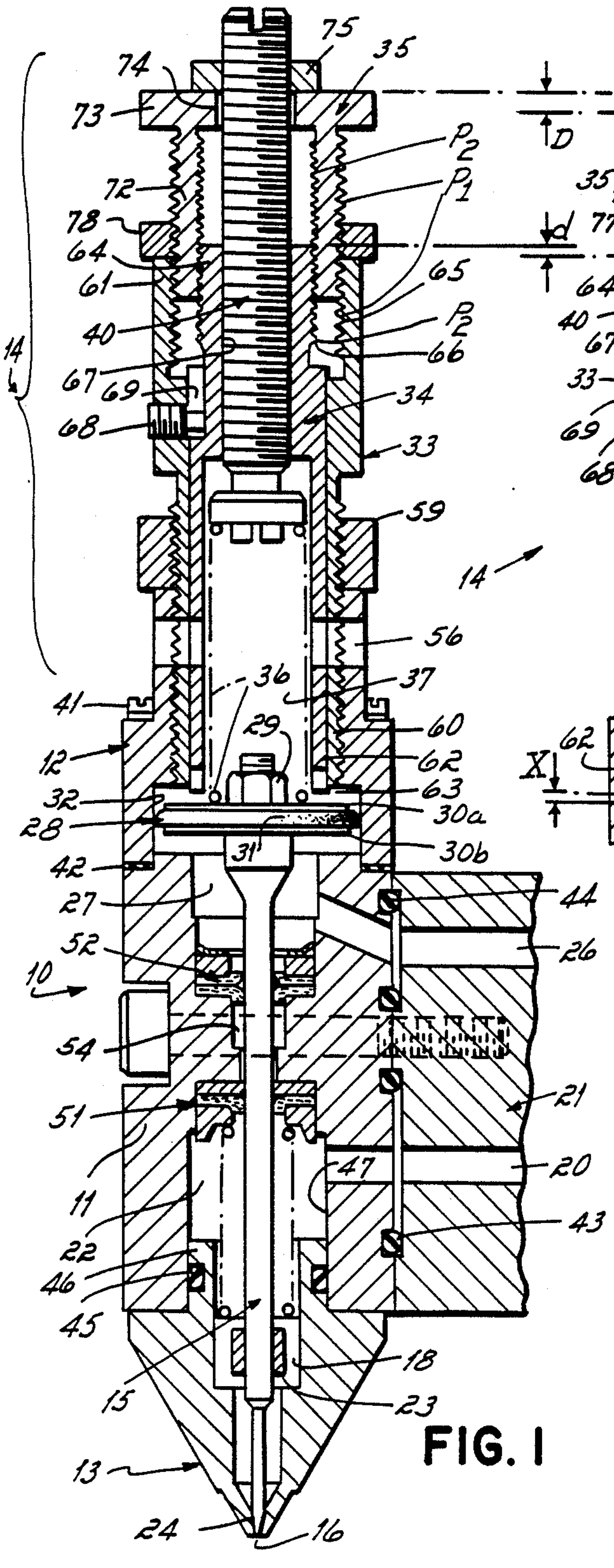
FIG. 1 is a cross-sectional view of a dispensing apparatus incorporating the invention of this application.

The invention of this application is shown embodied in a liquid-dispensing apparatus, or gun, generally indicated at 10. This gun 10 includes a generally cylindrical body 11, an end cap 12, and a nozzle 13. A flow-adjustment assembly generally indicated at 14 forms parts of the gun 10 and is attached to the end cap 12. The end cap 12, body 11, nozzle 13 and flow adjustment assembly 14 all have a longitudinal bore extending therethrough within which is located an axially movable needle valve 15 which ultimately controls the flow of liquid from the orifice 16 of the nozzle 13.

A liquid passageway 20 extends through a manifold 21 and through the cylinder body 11 into a forward cavity 22. Liquid flows through the liquid passageway 20 into the cavity 22 and then through axial passageways 18 provided in a needle valve guide bushing 23, progressing through the orifice 16 when the needle valve 15 is unseated from a valve seat 24 formed in the orifice 16.

Movement of the needle valve 15 into and out of engagement with the valve seat 24 is accomplished pneumatically. An air inlet 26 in manifold 21 extends through the cylinder body 11 to admit air under pressure to a rearward cavity 27, where it acts on a piston assembly 28 to effect movement of the needle valve 15. This piston assembly comprises a nut 29 threaded onto a threaded section of the needle valve 15, and a pair of piston rings **30*a* and 30*b* between which is sandwiched a resilient gasket 31. The outer edge of the gasket 31 contacts the interior surface of a cylinder 32 formed on the interior of the end cap 12, thus forming a pneumatic seal between the forward side of the piston assembly 28 and the surface of the cylinder 32**.

The flow-adjustment assembly 14, which will be described in more detail hereafter, is comprised of a support tube 33, a sleeve-stop element 34 located interior to the support tube 33, and a travel-adjustment screw element 35. A compression spring 36 is located in a compression spring cavity 37 within the sleeve-stop 34. One end of the spring contacts the surface of the rearmost piston ring **30*a*, while the other end abuts against the forward end of spring tension adjustment stud 40**.

The adjustment stud 40 is threaded into the sleeve-stop 34. By adjusting the axial position of the stud 40, the closing force on the needle valve 15 may be adjusted or varied. The needle valve 15 is thus ordinarily biased into engagement with valve seat 24, closing the orifice 16. The needle valve 15 is unseated from valve seat 24, opening the orifice 16, through the admission of air under suitable pressure through air inlet 26 which pressurizes the rearward cavity 27, moving piston assembly 28 against the bias of compression spring 36.

It may be noted that cap 12 is bolted onto the rearward end of the body 11 by screws 41. A resilient gasket seal 42 is preferably located between the contacting surfaces of the end cap 12 and the body 11. O-ring seals 43 and 44' are additionally provided between the manifold 21 and the cylinder body 11.

Nozzle 13 has a flange portion (not shown) which is secured to the forward portion of the cylinder body 11 as by screws (also not shown). An O-ring 45 provides a seal between a reduced diameter portion 46 of the nozzle 13 and the interior surface 47 of the cylinder forming the forward cavity 22. A forward seal assembly 51 and rearward seal assembly 52 seal the liquid-receiving forward cavity 22 from the air-receiving rearward cavity 27. A weep hole 54 is provided between the seal assemblies 51 and 52 through which any air or liquid which seeps through the seal assemblies may be vented from the gun body. An air vent 56 is additionally provided in the end cap 12.

The dispensing device heretofore described, except for the flow-adjustment assembly 14, is conventional and forms no part of the invention of this application per se, which primarily resides in the flow-control adjustment mechanism represented by the flow-adjustment assembly 14.

The support tube 33 of the flow-adjustment assembly 14 forms an extension of the end cap 12, as well as of the longitudinal bore of the gun 10. The support tube 33 is an elongated tube having a forward portion 60 which is threaded in the end cap 12, and a rearward portion 61. A lock-nut 59 is provided to secure the support tube 33 within the end cap 12. The forward portion 60 has a generally smooth, cylindrical interior surface. The rearward portion 61 also has a generally cylindrical interior surface which is of a slightly wider diameter than the forward portion 60. The rearward portion 61 further has screw threads 65 formed on the interior thereof of a pitch P1. It will be understood that right-hand threads are used throughout this description.

The sleeve-stop 34 is received in the forward portion 60 of the support tube 33 and is axially slidable therein. The sleeve element 34 is elongated and tubular in form, having a forward portion 62 terminating in end stops 63, and a rearward portion 64 which is externally threaded with threads 66 of a pitch P2. As indicated earlier, the sleeve-stop 34 has an interior cavity 37 within which the compression spring 36 is located. The rearward portion 64 of the sleeve has a longitudinal threaded bore 67 which receives a portion of the stud 40 which adjusts the tension of spring 36. The external diameter of the forward portion 62 of the sleeve element 34 is just slightly less than the internal diameter of the forward portion 60 of the support tube 33.

A set-screw 68 is located in a threaded screw opening in the side of the support tube 33. The set-screw 68 extends into a slot 69 formed in the transition area between the forward and rearward portions of the sleeve element 34. The slot 69 extends axially along the sleeve element 34, and has a reduced side-to-side width, such that the set-screw 68 will prevent rotation of the sleeve element 34 while permitting axial movement of the sleeve element.

Completing the flow-adjustment assembly 14 is the travel-adjustment screw 35. In this embodiment of the invention, the travel-adjustment screw 35 is generally tubular in shape, having a tubular forward portion 72 and a gripping portion 73 at the rearward end. An axial bore 74 in the end portion 73 permits the stud 40 to extend therethrough. A lock-nut 75 is located rearward of the end portion 73 to secure the stud 40 in position. Another lock-nut 78 secures the travel-adjustment screw 35 in a position of adjustment.

The forward portion 72 of the travel-adjustment screw 35 is sized to threadably engage both the internal threads 65 of the support tube 33 and the external threads 66 of the sleeve element 34. To this end, threads 76 of a pitch P1 are provided on the exterior of the forward portion 72 of travel-adjustment screw 35, and threads 77 of a pitch P2 are provided along the interior surface of the same portion 72.

Figure 2:
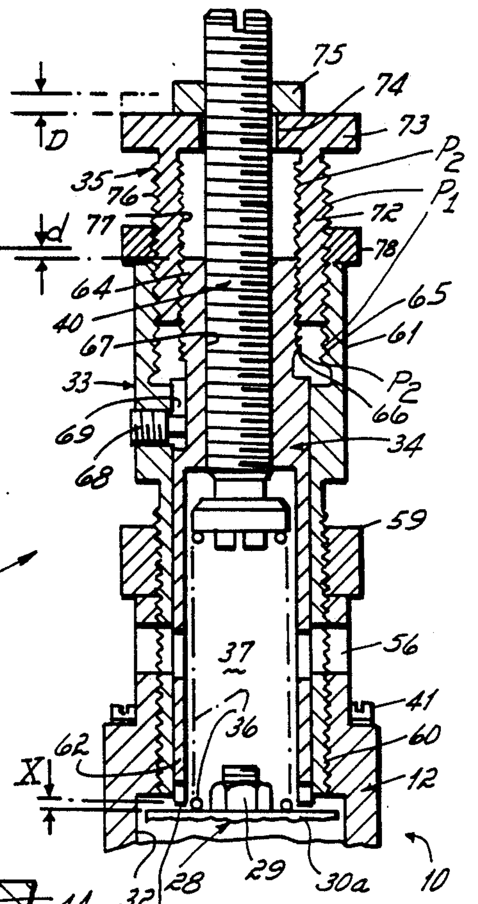
FIG. 2 is a view similar to FIG. 1 showing the relative movement of the threaded adjustment elements in a second and different position from that of FIG. 1.

A fine adjustment for the maximum travel of the needle valve 15 away from the orifice 16 has been produced through the pitch differential between the elements of adjustment assembly 14. A specific pitch of 28 threads per inch for P1 and 32 threads per inch for P2 has been used to advantage herein. The pitch differential translates rotation, and hence axially movement, of the travel-adjustment screw 35 into a smaller axial movement of the sleeve-stop 34, and therefore a smaller movement of the end stops 63 which form the limit to the travel of the piston 30 and needle valve 15. For example, rotation of the travel adjustment screw 35 causing it to screw into the support tube 33 a distance D (see FIG. 2) causes the sleeve-stop 34 to move rearwardly relative to the travel-adjustment screw 35 a distance d. Since the screw threads Pl are of a greater pitch (fewer threads per inch) than the screw threads P2, the overall movement of the sleeve-stop 34 relative to the end cap 12 is a distance X. This distance X represents the difference between D and d and is proportional to the pitch differential. That is, given $P1=28$ threads/in and $P2=32$ threads/in, clockwise rotation of travel-adjustment screw 35 through 14 revolutions will move the travel adjustment screw ½ in. forwardly (toward the nozzle opening). Sleeve-stop 34 will also move 14/32 of an inch rearwardly (into the travel-adjustment screw 35) as the result of the same rotational movement. The net movement of the end-stops 63 of the sleeve-stop 34 is thus 1/16 of an inch forwardly (the difference between the forward movement of travel-adjustment screw 35 and the rearward movement of the sleeve-stop 34).

Thus, while the invention has been described in connection with certain presently preferred embodiments, those skilled in the art will recognize many modifications of structure, arrangement, portions, elements, materials and components which can be used in the practice of the invention without departing from the principles of this invention.

What is claimed is:

1. An improved flow control device for a fluid-dispensing apparatus, comprising:
 a body with an axial bore therein and a nozzle communicating with one end of the bore having a nozzle orifice,
 a valve member axially movable within said axial body bore to open and close said nozzle orifice,
 means to move said valve member within said axial body bore, including spring means for biasing said valve to a closed position,
 means for adjusting the closing force of said spring means,
 a sleeve-stop member axially movable in said body bore, said sleeve-stop member having opposed ends, one end of said sleeve-stop member forming an end stop to the movement of said valve member away from the nozzle orifice, said sleeve-stop member having an axial bore therein, said spring means being located within said bore of said sleeve-stop member,
 key means for preventing rotary movement while permitting axial movement of said sleeve-stop member relative to said body bore,
 external screw threads of a first pitch formed on a portion of said sleeve-stop member,
 internal screw threads of a second pitch different from said first pitch formed on the body within the axial bore thereof, and
 adjustment-screw means for adjusting the maximum length of travel of the valve member away from the nozzle orifice, said adjustment screw means including a tubular portion externally threaded with threads of said second pitch and engaged with said second pitch threads of said body bore, and internally threaded with threads of said first pitch and engaged with said first pitch threads of said sleeve member, rotation of said adjustment-screw means causing differential axial movement of said sleeve-stop member for adjustment of the maximum opening travel of said valve.

2. The flow control device of claim 1 wherein said first pitch and said second pitch are of the same hand.

* * * * *